United States Patent [19]

Elmer et al.

[11] 4,351,662

[45] Sep. 28, 1982

[54] METHOD OF MAKING PHOTOSENSITIVE POROUS GLASS

[75] Inventors: Thomas H. Elmer, Corning; Che-Kuang Wu, Horseheads, both of N.Y.

[73] Assignee: Corning Glass Works, Corning, N.Y.

[21] Appl. No.: 277,069

[22] Filed: Jun. 25, 1981

[51] Int. Cl.$^3$ .......................... C03C 3/26; C03C 11/00
[52] U.S. Cl. .......................................... 65/30.1; 65/31; 430/13
[58] Field of Search ....................... 65/30.1, 30.11, 31; 430/13

[56] References Cited

U.S. PATENT DOCUMENTS 3,795,523 3/1974 Moriya et al. ........................ 65/30.1
4,313,748 2/1982 Macedo et al. ....................... 65/30.1

Primary Examiner—Richard V. Fisher
Attorney, Agent, or Firm—Kees van der Sterre

[57] ABSTRACT

A method for providing a dispersion of a photosensitive silver and chlorine-containing polyphosphate in the pores of a porous 96% silica glass, and a photosensitive product thus produced, are described. The method includes introducing NaCl and $KH_2PO_4$ into the pores using at least one liquid vehicle and at least partly removing the liquid vehicle from the pores. Thereafter, $AgNO_3$ is introduced into the NaCl and $KH_2PO_4$-containing pores using a liquid vehicle before heating the porous glass support to remove remaining liquid vehicle and to react the NaCl, $KH_2PO_4$, and $AgNO_3$ to form a photosensitive silver and chlorine-containing polyphosphate material in situ in the pores of said support.

3 Claims, 1 Drawing Figure

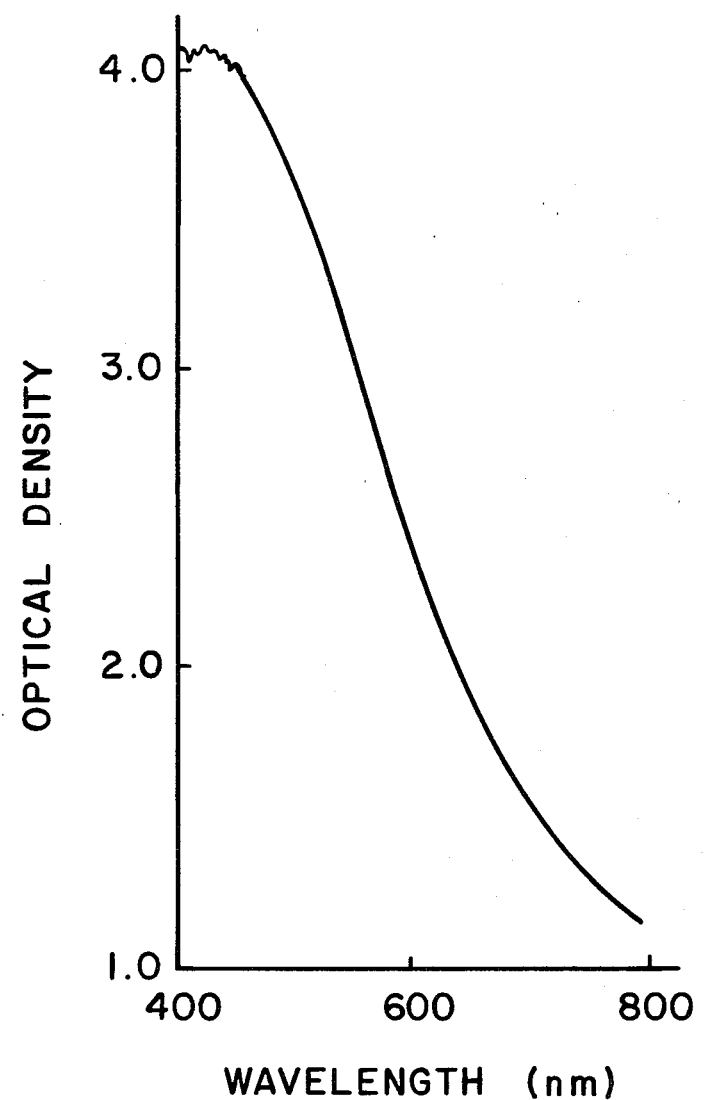

METHOD OF MAKING PHOTOSENSITIVE POROUS GLASS

BACKGROUND OF THE INVENTION

The present invention relates generally to photosensitive materials and particularly to a porous glass material which is rendered photosensitive by the introduction of a photosensitive silver and chlorine-containing polyphosphate material into the pore structure thereof.

Photosensitive silver and chlorine-containing polyphosphate materials have recently been described in a copending commonly assigned patent application by C-K Wu, filed Feb. 25, 1981 as Ser. No. 237,853. These materials may be characterized as viscous liquids and/or waxy solids provided by, first, forming a solid or liquid polyphosphate condensation product by condensing a mixture of $KH_2PO_4$ and $AG_3PO_4$ to remove water therefrom, and, secondly, reacting the condensate thus provided with dissolved NaCl to provide the photosensitive polyphosphate.

Photosensitive polyphosphates produced in accordance with the above-described application are intended to be useful in combination with porous support materials such as paper, cloth or the like, and can be applied thereto simply by physically impregnating the porous support with the polyphosphate and removing residual material therefrom. The resulting impregnated support exhibits good photosensitivity in ultraviolet, blue and even green light, such that visible images can be directly produced by exposure of the supported material without any need for chemical or physical development.

However the permanence of this medium is somewhat less than might be desired due to the comparatively fragile nature of paper and cloth support materials. Thus a photosensitive medium incorporating a photosensitive polyphosphate but exhibiting substantially improved physical durability would be desirable.

Porous glasses exhibiting good chemical and physical durability are known. For example, U.S. Pat. No. 2,106,744 to Hood et al. describes the manufacture of a durable porous glass product utilizing a process wherein a phase-separable alkali borosilicate glass is heated to cause phase separation into a major siliceous matrix phase and a minor interconnected thread-like phase rich in boron and alkali. This minor phase can be removed from the glass by leaching in acid to provide a porous glass product consisting of the siliceous matrix. Glasses of this type are referred to in the art as 96% silica glasses because they consist of about 96% silica by weight. They may be used in the porous condition or consolidated by heating to a non-porous state.

Attempts to incorporate the aforementioned newly discovered photosensitive polyphosphate materials into porous glasses such as above described have not been successful. The average pore size of 96% silica glasses produced in this manner is very small, on the order of 40–50 Å, and no method has been found by which sufficient photosensitive material can be worked into the microscopic pore structure to provide a photographic image of acceptable optical density upon exposure to light.

The advantages of a photosensitive porous glass material which could be treated to provide photographic images without chemical or physical development would be substantial. An image produced in such a glass could be quite permanent, resisting damage from physical abrasion in use. In addition, as in the case of the less durable supports, the image could be fixed by removing unexposed material from the pores via washing or the like, so that a permanent image resisting change upon subsequent exposure to light could be provided. If necessary, the image could be further protected from change by applying a protective coating or layer to the surface of the porous glass.

SUMMARY OF THE INVENTION

The present invention offers a method for providing a dense dispersion of a photosensitive silver and chlorine-containing polyphosphate material in the pores of a porous glass support of very small average pore diameter. For the purposes of the present description a glass of very small average pore diameter is a glass wherein the average pore diameter does not exceed about 50 Å.

Briefly the method of the invention comprises the steps of, first, introducing NaCl and $KH_2PO_4$ into the pores of the support using a liquid vehicle. The vehicle may be a non-polar liquid or, more typically and preferably, a solvent for the compounds, such as water.

Following the introduction of these compounds, the liquid vehicle is at least partly removed, for example by heating, and thereafter $AgNO_3$ is introduced into the pores already containing NaCl and $KH_2PO_4$, again using a liquid vehicle such as a suitable solvent. Finally, the support with the constituent compounds in the pores thereof is heated to remove any remaining vehicle and to react the NaCl, $KH_2PO_4$ and $AgNO_3$ to form the photosensitive silver and chlorine-containing polyphosphate in situ in the pores.

The product of the above-described method is an at least partly porous glass support wherein the pores contain a photosensitive silver and chlorine-containing polyphosphate product in a quantity providing good darkening on exposure to light. Hence, even though the pores have an average diameter not exceeding about 50 Å, the loading of the photosensitive material in the pores is sufficiently high that good optical density can be achieved in the material by an ordinary exposure to ultraviolet or short or medium wavelength visible light.

BRIEF DESCRIPTION OF THE DRAWING

The invention may be further understood by reference to the drawing, which is a graph plotting optical density as a function of wavelength for a photosensitive glass article provided in accordance with the invention, after that article has been darkened by exposure to a source of ultraviolet light.

DETAILED DESCRIPTION

While essentially any porous glass material could be used as a support for a photosensitive article to be provided in accordance with the invention, the preferred support material is a porous 96% silica glass produced by the process disclosed in the aforementioned Hood et al. patent. As previously noted, the production of porous 96% silica glass involves, first, heat-treating a phase-separable alkali borosilicate glass article, causing phase separation throughout the entire volume thereof, and thereafter immersing the glass in acid to remove the soluble phase therefrom. This removal progresses from the exterior of the article towards the center portion thereof, and may require several days to complete for an article of substantial cross-section.

For best leaching, the starting glass should contain at least about 70% $SiO_2$ by weight, with the remainder of the composition consisting essentially of about 10-20% $B_2O_3$, 3-6% $Na_2O$, 0-4% $Al_2O_3$ and 0-10% PbO by weight. Minor amounts of other glass modifiers such as $Li_2O$, $K_2O$, CaO and $P_2O_5$ are also permitted.

For the purposes of the present invention it is not required that the porosity of the glass substrate extend throughout the entire volume thereof because only a surface layer containing the photosensitive polyphosphate material is required for good darkening sensitivity. Thus the glass support need be provided with porosity in only a surface region or other portion thereof wherein the photosensitive response characteristics are needed. Typically, then, the glass support is a glass article comprising a porous surface layer which will have a depth in the range of about 10-120 microns. Of course, much deeper porous surface layers may be provided for special applications if desired.

Whereas the NaCl and $KH_2PO_4$ may theoretically be introduced into the pores of the porous glass support utilizing any liquid vehicle for transport, the preferred liquid vehicle is water. Thus impregnation of the porous glass with an aqueous solution of NaCl and/or $KH_2PO_4$ comprises the most convenient means for introducing these compounds into the very fine pore structure of porous 96% silica glasses.

These compounds can be introduced separately utilizing aqueous solutions of each compound sequentially, or they can be introduced together in a solution comprising both constituents. We have found that a relatively concentrated aqueous solution comprising both of these compounds constitutes a very satisfactory medium for simultaneously introducing the specified combination of materials into the pore structure of such glasses.

After the porous surface layer has been impregnated with the solution or solutions of these two compounds, partial removal of the liquid is required to provide space for the introduction of $AgNO_3$. Partial removal of a solvent such as water is most conveniently achieved by gentle heating of the impregnated glass until most of the water has been removed by evaporation. Heating at temperatures above the boiling point of water are not preferred because of the stress exerted upon the pore structure by rapid evaporation.

After the impregnated support has been suitably dried to remove excess water, $AgNO_3$ in a suitable vehicle is introduced. Again, an aqueous solution of silver nitrate constitutes the preferred method for introducing this compound into the pore structure of the glass. In the case of silver nitrate solutions, as in the case of the NaCl/$KH_2PO_4$ solutions, impregnation is conveniently accomplished simply by immersing the porous support into the prepared solutions. When using highly concentrated solutions of any of these compounds it may be advantageous to maintain the solutions at elevated temperatures to prevent crystallization of the dissolved compounds, but this expedient has no adverse effect upon either the impregnation process or the photosensitivity of the ultimate product.

After the porous support has been impregnated with silver nitrate, it is gently heated to remove residual water and, finally, to react the NaCl, $KH_2PO_4$ and $AgNO_3$ to form the photosensitive silver and chlorine-containing polyphosphate reaction product in situ in the pores of the glass. Gentle heating during the early stages of this step is preferred to avoid over-rapid evolution of water. After the water has been removed, however, heating to temperatures above the boiling point of water, for example 105° C. or above, are utilized to promote reaction among the three compounds to form the desired photosensitive product. Following this heating step, the glass and its supported photosensitive material should be shielded from light until it is desired to photographically record an image or other optical information thereupon.

The invention may be further understood by reference to the following illustrative example setting forth a procedure for the manufacture of a photosensitive article in accordance therewith.

EXAMPLE

An aqueous solution comprising NaCl and $KH_2PO_4$ is prepared by dissolving 13.9 grams of NaCl and 29.2 grams of $KH_2PO_4$ in 70 grams of distilled water. The solution is heated to a temperature of approximately 105° C. to completely dissolve the two compounds.

A glass plate approximately 2 cm × 0.5 cm × 0.1 cm in size, composed of an alkali borosilicate glass having an oxide composition, in weight percent, of about 4% $Na_2O$, 15% $B_2O_3$, 73% $SiO_2$, 6% PbO and 2% $Al_2O_3$ is utilized to provide a porous glass support. This glass slide is heated to a temperature of approximately 600° C. and maintained at this temperature for 3 hours to attain the separation of the glass into a silica-rich phase and an acid-soluble boron rich phase. After cooling to room temperature, this glass slide is immersed in a 1 N aqueous solution of nitric acid at 95° C. for an immersion interval of approximately 1 hour to permit the boron-rich phase to be leached from the glass surface and a porous surface layer formed to a depth of approximately 83 microns. The glass is then removed from the acid solution, rinsed in distilled water, and dried at 50° C. for about 2 hours.

The glass support with porous surface layer is immersed for one minute in the previously prepared NaCl/$KH_2PO_4$ solution, the solution being maintained at 105° C. to avoid crystallization, and is thereafter removed from the solution and briefly rinsed in distilled water at room temperature utilizing three separate immersions of approximately one second duration each. The rinsed glass is then dried in an oven at 87° C. for approximately 10 minutes.

The dried support impregnated with NaCl and $KH_2PO_4$ is then immersed in a silver nitrate solution composed of 61 grams of $AgNO_3$ and 50 grams of water by weight. The immersion is for a period of one minute at room temperature. Following this immersion the plate is rinsed and dried as above described for the NaCl/$KH_2PO_4$ impregnation step.

Following drying at 87° C., the treated plate is given a further heat treatment at 105° C. for approximately 30 minutes. It is then cooled to room temperature and examined. The product is a glass plate exhibiting a slight yellowish coloration due to the presence of a photosensitive silver and chlorine-containing polyphosphate reaction product in the porous surface layer thereof. Since the plate will darken upon exposure to light, it is kept in a darkened container until needed for use.

To test the optical sensitivity of the plate thus provided, a portion of the plate is exposed to an ultraviolet light source consisting of a 6-watt Blak-Ray ® UVL-56 lamp for an exposure interval of 10 minutes. The effect of this exposure is to completely darken the exposed portion of the plate. The optical density of the exposed portion is such that it appears totally black to the eye when viewed in normal room lighting.

The optical absorption characteristics of the darkened portion of the plate were examined in the visible spectrum with a spectral photometer. The drawing consists of a plot of the optical density of the exposed portion as a function of wavelength over the wavelength range from about 400 to about 800 nanometers. As is evident from a study of that drawing, the optical density of the sample is very high, particularly in the 400–600 nanometer range, even though the thickness of the impregnated porous surface layer of the sample is only about 83 microns. This indicates that a silver and chlorine-containing photosensitive polyphosphate of high optical sensitivity has been successfully developed in situ in the porous surface layer of the plate.

The high photosensitivity of this polyphosphate material when produced in situ in a porous glass matrix in the manner described is particularly unexpected when it is recognized that the attempted production of the same material by the same preparation procedure in an external environment has not been successful. Combining the same materials in the same way in an open glass container, using the same evaporation and reaction heating steps, produces a darkened non-photosensitive product wherein a significant reduction of silver to light absorbing atomic aggregates has apparently already occurred.

Of course the foregoing example is merely illustrative of procedures and practices which could be resorted to in carrying out the invention as hereinabove described. It will be apparent that numerous variations and modifications of these procedures and practices may be resorted to by those skilled in the art within the scope of the appended claims.

We claim:

1. A method of providing a dispersion of a photosensitive silver and chlorine-containing polyphosphate in the pores of a porous glass support with a small average pore diameter which comprises the steps of:
    (a) introducing NaCl and $KH_2PO_4$ into the pores using at least one liquid vehicle;
    (b) at least partly removing the liquid vehicle from the pores;
    (c) introducing $AgNO_3$ into the NaCl and $KH_2PO_4$-containing pores using a liquid vehicle; and
    (d) heating the glass support to remove remaining liquid vehicle and to react the NaCl, $KH_2PO_4$ and $AgNO_3$ to form a photosensitive silver and chlorine-containing polyphosphate material in situ in the pores of said support.

2. A method in accordance with claim 1 wherein the NaCl and $KH_2PO_4$ are simultaneously introduced into the pores as constituents of an aqueous solution.

3. A method in accordance with claim 2 wherein the $AgNO_3$ is introduced into the pores as a constituent of an aqueous solution.

* * * * *